March 22, 1955  J. CZETLI  2,704,402
APPARATUS FOR MEASURING CONTINUOUS WEB MATERIAL
Filed May 6, 1952  3 Sheets-Sheet 1
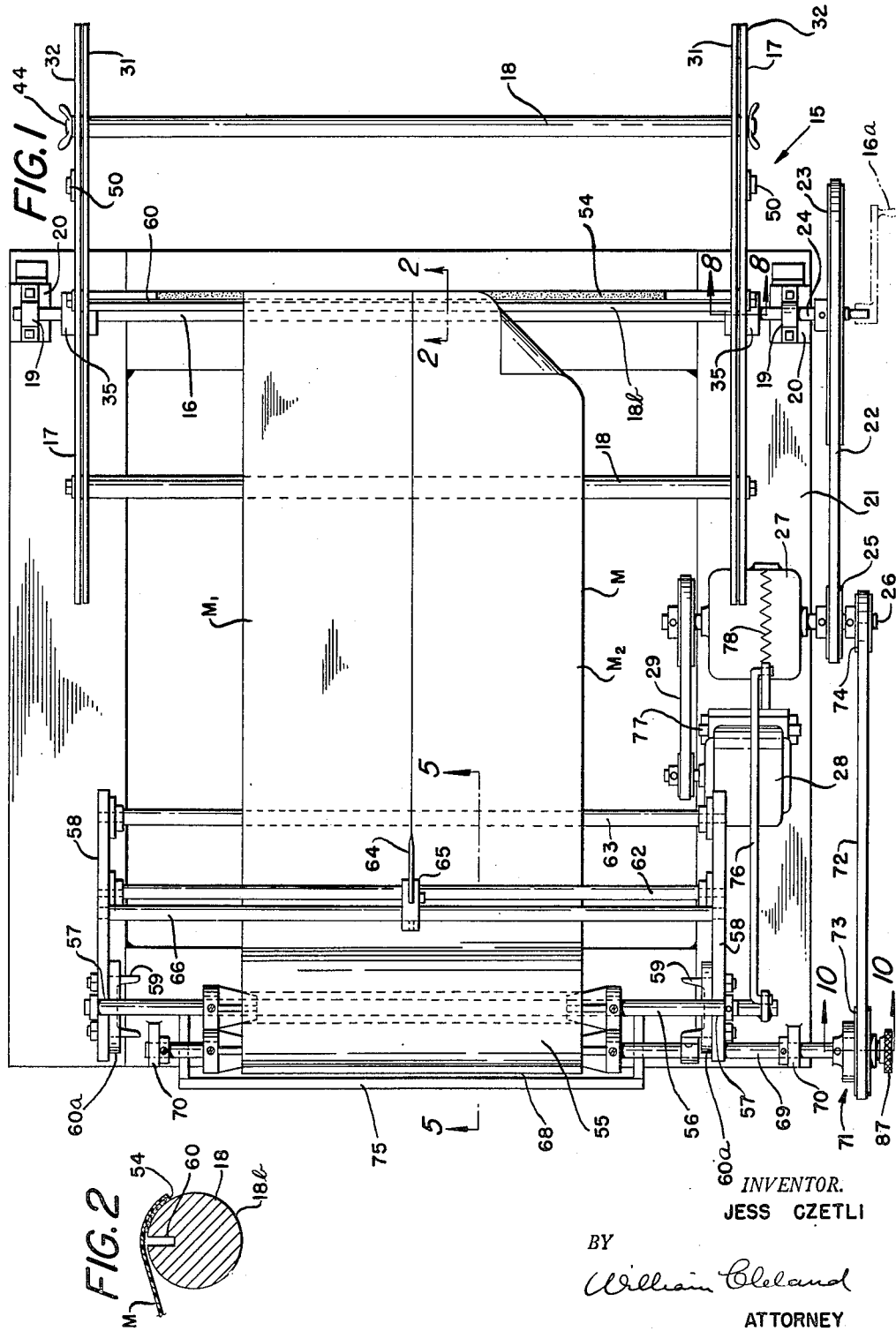
INVENTOR.
JESS CZETLI
BY
William Cleland
ATTORNEY

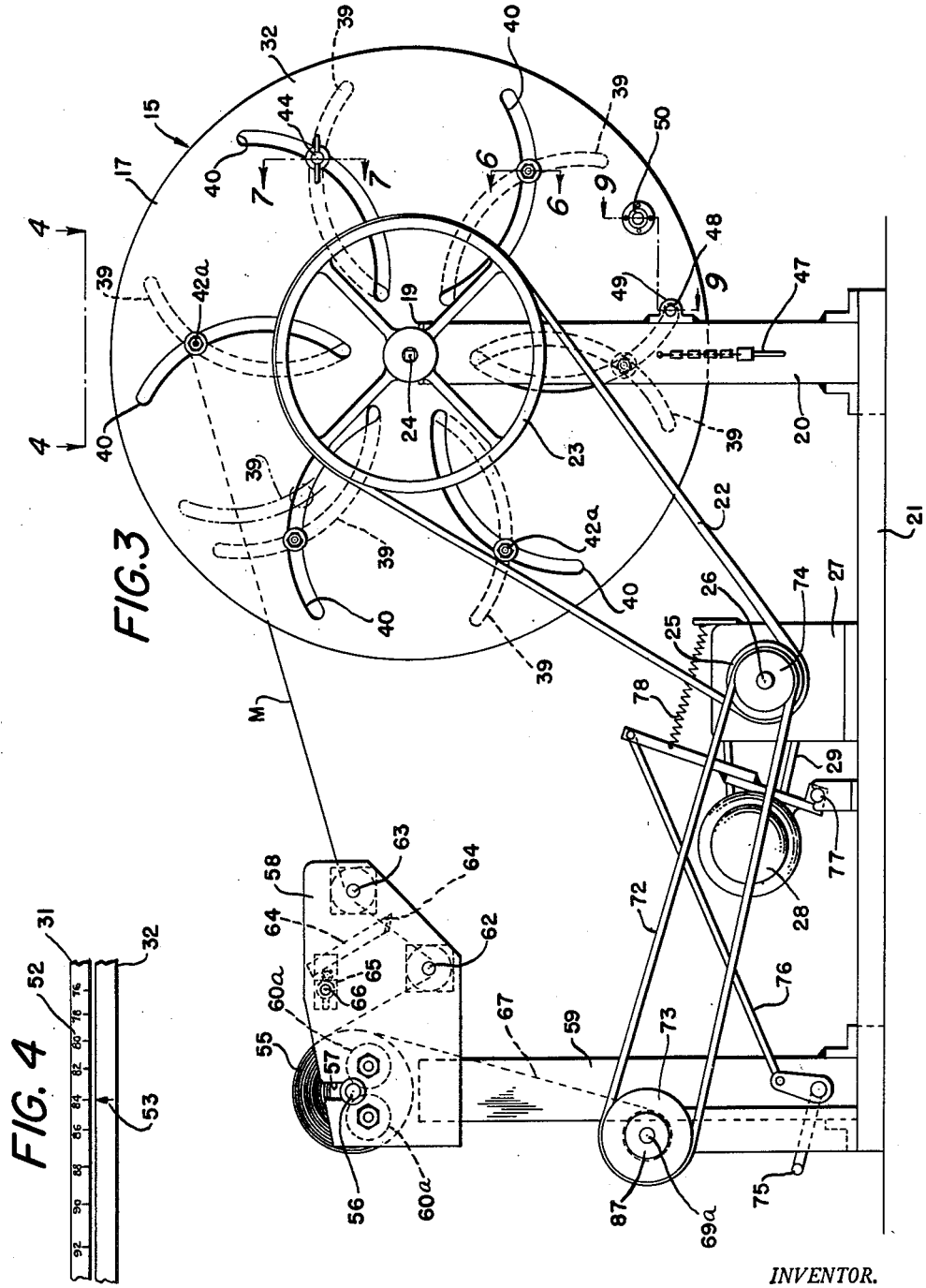

March 22, 1955     J. CZETLI     2,704,402
APPARATUS FOR MEASURING CONTINUOUS WEB MATERIAL
Filed May 6, 1952     3 Sheets-Sheet 3
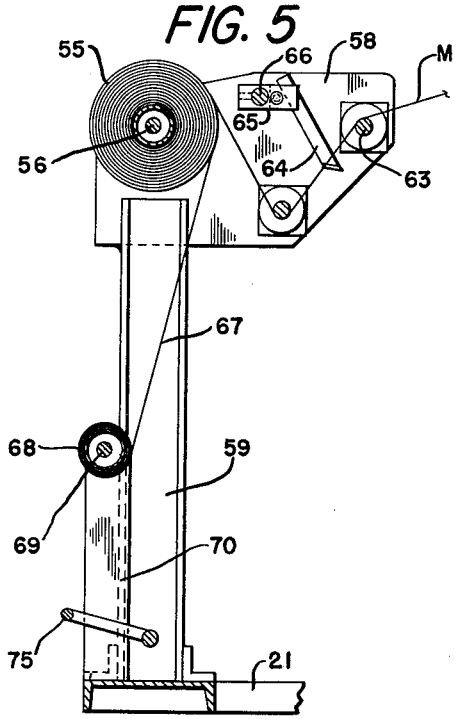
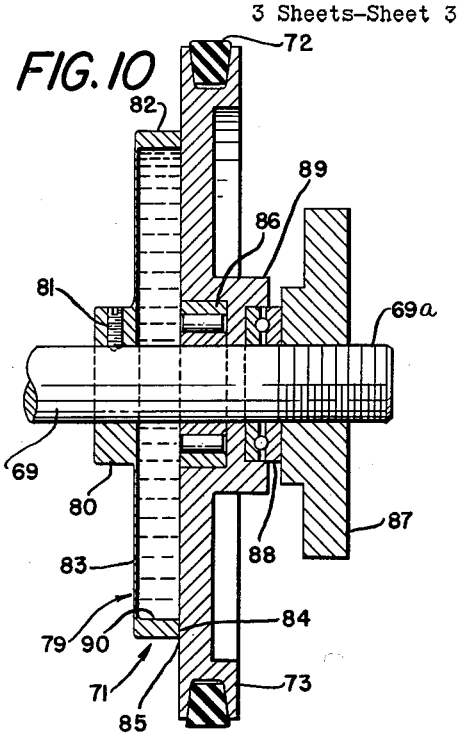
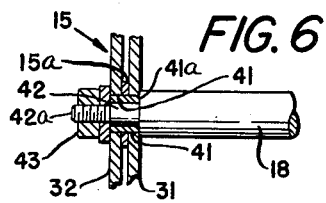
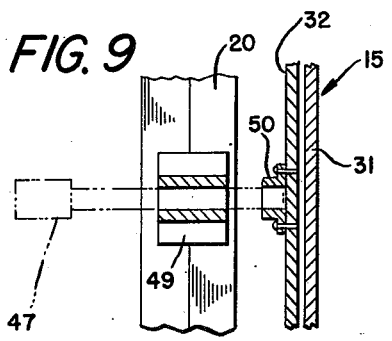
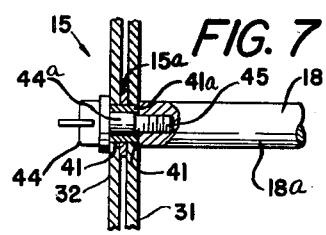
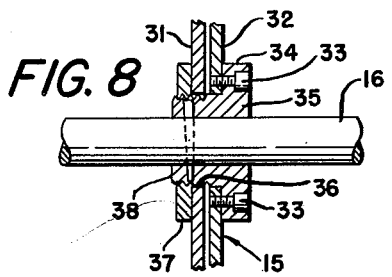
INVENTOR.
JESS CZETLI
BY
William Cleland
ATTORNEY

United States Patent Office 2,704,402
Patented Mar. 22, 1955

2,704,402

APPARATUS FOR MEASURING CONTINUOUS WEB MATERIAL

Jess Czetli, Copley, Ohio, assignor to Plastic Film Products Corporation, Akron, Ohio, a corporation of Ohio Application May 6, 1952, Serial No. 286,315

8 Claims. (Cl. 33—135)

This invention relates to apparatus for measuring continuous material, and particularly web material such as plastic film or fabric.

One object of the present invention is to provide a relatively simple machine by which thin plastic film or like web material drawn from a continuous source is rapidly measured and cut to predetermined uniform length, such as for window drapes.

Another object of the invention is to provide a measuring machine of the character described which by a simple operation is quickly and easily adjustable to vary the predetermined length according to specific requirements.

Another object of the invention is to provide in apparatus of the character described an improved clutch which is self-adjusting to slip under predetermined overloads applied through the same.

Another object of the invention is to provide in apparatus of the character described improved means for separating the usual paper liner from a roll of the web material, including compensating means for preventing breakage of the paper due to the difficulty of synchronizing the angular velocities of the take-off rolls for the web and the liner with the angular velocity of the supply roll from which they are drawn.

Other objects of the invention will be manifest from the following brief description and the accompanying drawings.

Of the accompanying drawings:

Figure 1 is a top plan view of a plastic film or like web measuring and cutting machine embodying the features of the invention.

Figure 2 is an enlarged fragmentary view, taken substantially on the line 2—2 of Figure 1, and showing guide means utilized in cutting the measured material into lengths thereof.

Figure 3 is a front elevation of the machine shown in Figure 1.

Figure 4 is a fragmentary top edge view, taken substantially on the line 4—4 of Figure 3, of one wall of a winding and measuring reel of the machine, and illustrating indexing means for setting the reel to cut different lengths of plastic film.

Figure 5 is a vertical cross-section, taken substantially on the line 5—5 of Figure 1 and on the same scale, illustrating film supply, film slitting and paper take-off devices.

Figure 6 is an enlarged cross-section taken substantially on the line 6—6 of Figure 3, illustrating sliding bearing connections for adjustable cross-rods on the measuring reel.

Figure 7 is a view similar to Figure 6, taken substantially on the line 7—7 of Figure 3, showing a device for locking the reel in a given position of measuring adjustment.

Figure 8 is an enlarged fragmentary cross-section, taken substantially on the line 8—8 of Figure 1, showing the hub construction of the reel.

Figure 9 is an enlarged fragmentary view, taken substantially on the line 9—9 of Figure 3, showing a device for locking a part of the reel while making a said measuring adjustment.

Figure 10 is a fragmentary cross-section, taken substantially on the line 10—10 of Figure 1, and illustrating an overload or compensating clutch utilized in the machine.

Referring to the drawings generally the numeral 15 designates a rotatable measuring reel, including a horizontal shaft 16, laterally spaced end walls 17, 17 thereon, and a plurality of peripherally spaced cross-rods or bars 18, 18 mounted between said walls to be adjusted radially inwardly or outwardly with respect to the axis of said shaft. For mounting the reel 15 to be rotatable about a horizontal axis said shaft is journalled in bearings 19, 19 at the upper ends of laterally spaced uprights 20, 20 secured to a base 21, and the reel is adapted to be rotated by a belt 22 extended between a pulley 23, keyed on an outward extension 24 of shaft 16, and a smaller pulley 25 on a shaft 26 of a gear reduction unit 27, in turn driven by an electric motor 28 through belt drive means 29.

For providing radial adjustment of reel 15, each end wall 17 thereof may comprise a pair of superposed inner and outer disc-shaped plates 31 and 32, respectively, the outer plate 32 being attached as by screws 33, to a flange 34 of a hub 35 which is suitably keyed to the shaft 16 (see Figure 8) and the inner plate 31 being rotatably mounted on a reduced part 36 of the hub and rotatably retained against the outer plate by a nut 37 threaded on an inward extension 38 of reduced part 36. The plates 31 and 32 are provided with series of circumferentially spaced, radially extending slots 39, 39 and 40, 40, respectively, corresponding slots 39 and 40 being curved oppositely outwardly in circumferential direction to provide bearing openings 41, 41 at the intersections thereof (Figure 7), at a given variable radius from the axis of shaft 16, for supporting reception of rollers 41a on reduced end portions 42, 42 of the cross-rods 18. The rods 18 are retained between the walls 15 by means of nuts 43, 43 received on threaded extensions 42a of the reduced end portions 42 in a manner which permits relative rotation of plates 31 and 32. As shown in Figure 7, one said rod, further designated 18a, however, has the roller 41a on a shank portion 44a of a thumb-screw 44, a threaded extension 45 of which is threaded into the corresponding end of shaft 18a. The shank 44a is shorter than the thickness of the dual plate wall 15, whereby the thumb-screw 44 may be tightened to clamp the plates 31 and 32 against relative rotation in given positions of adjustment thereof (see Figures 3 and 7). Washers 15a are provided between the plates 31 and 32, at the ends of the shafts 18, to facilitate said relative rotation of the plates. In order to facilitate such adjustment locking pins 47 are insertable through apertures 48 in a bracket 49, fixed on the upright 20, and into a socket member 50 fixed on the corresponding outer plate 32, thereby to hold the outer plates 32 fixed while the inner plates are being rotated, as by means of the crank 16a shown in chain-dotted lines in Figure 1, to urge the cross-rods 18, 18 radially inwardly or outwardly in unison. Indicia in the form of units of linear measure, such as lengths in yards for plastic film drapes (not shown), may be provided on the peripheral edge of each inner plate 31 as designated at 52, in conjunction with an indexing mark 53 on the peripheral edge of the corresponding outer plate 32, indicate the length of a single convolution or circumference of web material wrapped around the outer peripheral portions of the rods 18 in various said given positions of radial adjustment thereof. When proper adjustment is thus attained at each side of reel 15, the thumb-screws 44 are tightened to clamp the inner and outer plates 31 and 32 together, after which locking pin 47 is removed to permit rotation of the reel as a unit.

As best shown in Figures 1 and 2, one of the rods 18, further designated 18b, may have a long, narrow strip or coating 54 of tacky plastic adhesive of known type thereon, for repeated releasable attachment of the leading edge of continuous web material M, from a roll 55 thereof, to be measured and cut to predetermined size, an elongated slot 60 being provided in said rod 18b, coextensive with said adhesive strip 54 to receive a cutting tool or blade for slitting the web laterally in a manner to be described. The roll 55 may be suitably mounted on a shaft 56 having opposite ends received in vertical slots 57 in the upper edges of laterally spaced plates 58, 58 at the upper ends of correspondingly spaced uprights 59, 59 on the base plate 21, said shaft being rotatably supported between pairs of spaced rollers 60a, 60a mounted on said plates 58.

The web material M may be drawn from the roll 55 thereof, by said rotation of reel 15, under and over suitably spaced tensioning rods 62 and 63, respectively, mounted between said laterally spaced plates 58. A knife 64 is removably secured to a bracket 65 laterally adjustably mounted on a bar 66 which is supported between said plates 58, to be at a point between the tensioning rods 62 and 63, for slitting the web material M longitudinally into separate strips $M_1$ and $M_2$.

When a paper or like separator strip 67 is provided in the supply roll 55 it may be removed therefrom in synchronism with rotation of the reel 15 to draw the material M therefrom, by winding said paper strip onto a driven roll 68, suitably removably mounted on a shaft 69 journalled between laterally spaced supports 70, 70 on base 21. Shaft 69 is rotated, through clutch means 71 to be described, by a belt 72 extended between a pulley 73, forming a part of the clutch means, and a smaller pulley 74 keyed on the reducer shaft 26 which also drives pulley belt 22 for the reel 15.

A foot pedal 75 is operable through suitable linkage 76 to move motor unit 28 on a pivotal mounting means 77 thereof, to apply requisite tension to transmission means 29, against the resiliency of a spring 78, to drive reducer 27 and in turn drive the reel 15 to draw material M from supply roll 55.

Clutch means 71, above referred-to, is provided to compensate for increasing linear speed at the surface of the paper-retrieving roll 68. This clutch is best shown in Figures 1 and 10, and may include a cup-shaped metal or like member 79 having a rigid hub portion 80 affixed to shaft 69, as by means of a set screw 81, and a thick, rigid annular flange 82 connected to said hub by a relatively stiff, but thin, flexible, springy web portion 83. The outer edge 84 of said flange is of relatively flat, broad lateral area to engage a corresponding flat inner face 85 of the pulley 73, said pulley being rotatably mounted on a roller bearing 86. A knob or nut 87 threaded on the outer end 69a of shaft 69 is manually operable against a thrust bearing 88, seated in a recessed boss 89 of pulley 73, to urge the pulley axially on the shaft toward flat engagement of said pulley face 85 with flange 82, against the springy or yielding resiliency of web 83. Thus, the knob 87 is operable to adjust the frictional tension between pulley 73 and member 79, whereby the clutch will slip as necessary to avoid tearing the paper strip 67 which otherwise would be caused by over-tensioning of the same when the paper is wound up too fast. The cup-shaped member 79, with the pulley 73 forms an enclosed chamber 90 which contains a quantity of suitable lubricating oil, which to a desired extent lubricates the frictionally engaging surfaces of flange 82 and pulley 73. This lubrication of the frictionally engaging clutch surfaces makes the slip-clutch gripping action more positive and more consistently reliable than when oil is omitted, and at the same time reduces wear at the frictionally engaging surfaces to a minimum.

In operation of the apparatus for measuring plastic film (synthetic resin) to exact size for use as window drapes, for example, the operator first inserts the locking pins 47 through brackets 49 and into the sockets 50 to hold the outer plates 32 of the reel 15 stationary, the motor 28 normally being inoperative to rotate the reel, as best shown in chain-dotted lines in Figure 9. Next, after releasing the clamping thumb screws 44, he rotates the inner reel plates 31 in proper direction, as described above to locate the desired drape-length marks on scales 52 of plates 31 (Figure 4) opposite the index marks 53 on plates 32, thereby to move the cross-rods 18 radially inwardly or outwardly to desired radius from the axis of shaft 16 at which the outer perimeter of a single wrapping or convolution of material M about the rods 18 will be of corresponding measurement. The operator then turns thumb screws 44 to clamp plates 31 and 32 together at each side of the reel and removes the locking pins 47 to permit free rotation of the reel as a unit.

Now the operator manually feeds material M from supply roll 55 thereof, under and over the tensioning rods 62 and 63, respectively, as shown in Figures 1 and 3, and adheres the leading end of the material to the adhesive strip 54 on the cross-rod 18b, which has been presented upwardly for that purpose, as best shown in Figures 1 and 2. At this point the paper insert 67 from rolls 55 is fed onto the take-off roller 68, as shown in Figures 1, 3 and 5, and the desired tension is applied to the clutch means 79, by operation of adjusting knob 87 (Figures 1, 3 and 10), the operator learning by experience the tension which will prevent overloading which would tear the paper.

With the machine thus set for operation, the operator now starts motor 28 and depresses foot lever 75, simultaneously to revolve the reel 15 and roll 68 as previously described. Lever 75 is held depressed until reel 15 has made a predetermined number of revolutions, determined by mental count or by visible observation of a mechanical counter of known type (not shown). As the material M is thus drawn onto the reel 15, knife 64 is utilized to slit the material longitudinally, if required, to provide two strips $M_1$ and $M_2$ (see Figure 1).

When the predetermined number of revolutions of reel 15 has been observed the operator releases the foot pedal 75 to stop rotation of the reel and the rolls 55 and 68, preferably to have the slotted cross-rod 18b presented upwardly in the stopped position. At this point a cutting tool or knife is inserted in the guide slot 60 and drawn along the same to cut through the multiple layers or convolutions of material M wound on the reel, thereby to provide as many pieces of material $M_1$ or $M_2$ of said predetermined length indicated at 53 in Figure 4, as there are convolutions wound on the reel. It has been found that up to 30 or more convolutions of plastic film for window drapes, depending on its thickness, may be wound on the reel without having material variation in the lengths of the several pieces. This winding and lateral severing process may be repeated as often as necessary to provide the desired number of pieces of the same length.

The apparatus described is simple to operate and to adjust for providing drapes of different lengths. The measuring and cutting procedure is accomplished much more rapidly and more uniformly accurately than has been possible by use of known prior devices and methods, and it is more readily possible to maintain the material in smooth, unwrinkled condition.

Modifications of the invention may be resorted to without departing from the spirit thereof or the scope of the appended claims.

What is claimed is:

1. Apparatus for measuring continuous material comprising a reel including a hub and laterally spaced end walls, said end walls each including superposed members one of which is fixed with respect to said hub to rotate therewith and the other is rotatable relative to the hub, releasable locking means for locking said relatively rotatable members to be rotatable with said hub, the superposed members of each said wall having directionally oppositely disposed radial guide slots therein intersecting to provide circumferentially spaced bearing openings through each said wall at a given radius from the axis of said hub, a series of parallel bars having opposite ends mounted through said spaced openings of the respective said walls, means for revolving said reel about its axis to wind continuous material around the outer portions of said bars, and cooperating indicia on said superposed members of at least one said wall and designating various linear measurements based on a perimeter including said outer surface portions of said bars, said locking means being releasable to permit rotation of the relatively rotatable members in either direction to various positions indicated by said indicia and thereby to change the positions of said intersecting portions of the slots and to change said perimeter accordingly.

2. Apparatus for measuring continuous material comprising a reel including a hub and laterally spaced end walls, said end walls each including superposed disclike members one of which is fixed with respect to said hub to rotate therewith and the other is rotatable relative to the hub, releasable locking means for locking said relatively rotatable members to be rotatable with said hub, the superposed members of each of said wall having directionally oppositely disposed radial guide slots therein intersecting to provide circumferentially spaced bearing openings through each said wall at a given radius from the axis of said hub, a series of parallel bars having opposite ends mounted through said spaced openings of the respective said walls, means for revolving said reel about its axis to wind continuous material around the outer portions of said bars, and cooperating indicia on the peripheral edges of said superposed members of at least one said wall and designating various linear measurements based on a perimeter including said outer surface portions of said bars, said locking means being releasable to permit rotation of the relatively rotatable members in either direction to various positions indicated by said indicia and thereby to change the positions of said intersecting portions of the slots and to change said perimeter accordingly.

3. Apparatus for measuring continuous material comprising a reel including a hub and laterally spaced end walls, said end walls each including superposed members one of which is fixed with respect to said hub to rotate therewith and the other is rotatable relative to the hub, releasable locking means for locking said relatively rotatable members to be rotatable with said hub, the superposed members of each said wall having directionally oppositely disposed radial guide slots therein intersecting to provide circumferentially spaced bearing openings through each said wall at a given radius from the axis of said hub, a series of parallel bars having opposite ends mounted through said spaced openings of the respective said walls, means for revolving said reel about its axis to wind continuous material around the outer portions of said bars, and cooperating indicia on said superposed members of at least one said wall and designating various linear measurements based on a perimeter including said outer surface portions of said bars, said locking means being releasable to permit rotation of the relatively rotatable members in either direction to various positions indicated by said indicia and thereby to change the positions of said intersecting portions of the slots and to change said perimeter accordingly, at least one of said bars having elongated guide means extending laterally of said reel for reception of a cutting tool to cut through layers of material wound around said outer portions of said bars.

4. Apparatus for measuring continuous material comprising a reel including a hub and laterally spaced end walls, said end walls each including superposed members one of which is fixed with respect to said hub to rotate therewith and the other is rotatable relative to the hub, releasable locking means for locking said relatively rotatable members to be rotatable with said hub, the superposed members of each said wall having directionally oppositely disposed radial guide slots therein intersecting to provide circumferentially spaced bearing openings through each said wall at a given radius from the axis of said hub, a series of parallel bars having opposite ends mounted through said spaced openings of the respective said walls, means for revolving said reel about its axis to wind continuous material around the outer portions of said bars, and cooperating indicia on said superposed members of at least one said wall and designating various linear measurements based on a perimeter including said outer surface portions of said bars, said locking means being releasable to permit rotation of the relatively rotatable members in either direction to various positions indicated by said indicia and thereby to change the positions of said intersecting portions of the slots and to change said perimeter accordingly, one of said bars having thereon means for releasably attaching the leading end of the continuous material.

5. Apparatus for measuring continuous material comprising a reel including a hub and laterally spaced end walls, said end walls each including superposed members one of which is fixed with respect to said hub to rotate therewith and the other is rotatable relative to the hub, releasable locking means for locking said relatively rotatable members to be rotatable with said hub, the superposed members of each said wall having directionally oppositely disposed radial guide slots therein intersecting to provide circumferentially spaced bearing openings through each said wall at a given radius from the axis of said hub, a series of parallel bars having opposite ends mounted through said spaced openings of the respective said walls, means for revolving said reel about its axis to wind continuous material around the outer portions of said bars, and cooperating indicia on said superposed members of at least one said wall and designating various linear measurements based on a perimeter including said outer surface portions of said bars, said locking means being releasable to permit rotation of the relatively rotatable members in either direction to various positions indicated by said indicia and thereby to change the positions of said intersecting portions of the slots and to change said perimeter accordingly, at least one of said bars having elongated guide means extending laterally of said reel for reception of a cutting tool to cut through layers of material wound around said outer portions of said bars, one of said bars having thereon means for releasably attaching the leading end of the continuous material.

6. Apparatus as set forth in claim 1, including a support for rotatably mounting a roll of continuous material of given width to be fed onto said reel, and a cutter mounted in the path of said material intermediate the support and the reel to slit the material longitudinally.

7. Apparatus as set forth in claim 3, including a support for rotatably mounting a roll of continuous material of given width to be fed onto said reel, and a cutter mounted in the path of said material intermediate the support and the reel to slit the material longitudinally.

8. Apparatus for measuring continuous material comprising a reel including a hub and laterally spaced end walls, said end walls each including superposed members one of which is fixed with respect to said hub to rotate therewith and the other is rotatable relative to the hub, releasable locking means for locking said relatively rotatable members to be rotatable with said hub, the superposed members of each said wall having directionally oppositely disposed radial guide slots therein intersecting to provide circumferentially spaced bearing openings through each said wall at a given radius from the axis of said hub, said oppositely disposed radial guide slots being curved oppositely outwardly in circumferential direction, a series of parallel bars having opposite ends mounted through said spaced openings of the respective said walls, means for revolving said reel about its axis to wind continuous material around the outer portions of said bars and means operable by relative rotation of said members of at least one said wall to designate various linear measurements based on a perimeter including said outer surface portions of said bars, said locking means being releasable to permit rotation of the relatively rotatable members in either direction to various positions indicated by said indicia and thereby to change the positions of said intersecting portions of the slots and to change said perimeter accordingly.

References Cited in the file of this patent

UNITED STATES PATENTS

| Number | Name | Date |
|---|---|---|
| 298,670 | Crosby | May 13, 1884 |
| 1,985,524 | Stacey | Dec. 25, 1934 |
| 2,016,581 | Sieg | Oct. 8, 1935 |
| 2,208,774 | Pierson | July 23, 1940 |
| 2,269,573 | Barry | Jan. 13, 1942 |
| 2,345,910 | Fawcett | Apr. 4, 1944 |
| 2,564,103 | Gallagher | Aug. 14, 1951 |

FOREIGN PATENTS

| Number | Country | Date |
|---|---|---|
| 4,318/85 | Great Britain | Apr. 7, 1885 |
| 642,114 | Great Britain | Aug. 30, 1950 |